United States Patent Office 2,817,893
Patented Dec. 31, 1957

2,817,893
SOLDERING FLUX COMPOSITION

George L. Cunningham, Greer, S. C., and Albert Yee, Cleveland, Ohio, assignors to Horizons Incorporated, Princeton, N. J., a corporation of New Jersey No Drawing. Application August 16, 1956
Serial No. 604,336

4 Claims. (Cl. 29—487)

This invention relates to a soldering flux. More particularly, it relates to a flux useful in the joining of aluminum members with or without the use of additional solder material.

The joining of aluminum and of alloys consisting primarily of aluminum to one another and to other metals is complicated by a phenomenon which is characteristic of aluminum and aluminum base alloys, namely the formation of a thin and almost invisible coating of oxide on the metal on contact with the ordinary atmosphere or any other oxidizing environment. To remove this oxide as a condition precedent to joining, a number of methods are known in the art, including treatment chemically by acids or alkalis, treatment physically by scratching, sandblasting or abrading, and treatment by various appropriate compositions which flux, melt, dissolve, or otherwise remove the aluminum oxide from the surface of the members to be joined. This invention is concerned with compositions which are useful in the latter method of preparation.

Fluxes for removing the superficial film of aluminum oxide fall generally into different classes depending upon whether the joining is to be accomplished by welding, brazing or soldering. Welding or brazing are carried out at temperatures in the region of the melting point of one or both of the members being joined and the flux employed is required to possess stability and chemical activity at these elevated temperatures. For soldering, much lower temperatures are used and the flux composition must be one which is fluid at the lower temperatures and which possesses the necessary chemical activity or dissolving power to perform the desired removal of oxide. Because the temperatures for soldering differ so greatly from those encountered when brazing or welding, entirely different types of fluxes are required to accomplish the latter.

One type of flux which has been employed successfully in the past depends for its utility on the removal of the film of aluminum oxide by reaction or solution in one portion of the flux and the deposition of a "tinning" metal on the freshly exposed aluminum surface by reaction between the aluminum and another portion of the flux composition. Such fluxes are known as reaction type fluxes and include at least one compound of a metal which can be displaced from its compounds by the aluminum. Compounds of zinc, cadmium, tin, lead, antimony and bismuth, particularly their halides, are commonly employed as the reactive component of such fluxes.

Among the prior art reaction type fluxes developed for joining light metals are those described in United States Patents 2,299,164; 2,299,165; 2,299,166; 2,299,167 and 2,299,168 which issued October 20, 1942. The fluxes disclosed in these patents are based on a carrier or vehicle composed of any two or more of the chlorides of sodium, potassium and lithium together with minor amounts of fluorides and limited amounts of one or more halides of the metals below aluminum in the electromotive series. As disclosed in the patents, these fluxes are intended to be used with a brazing filler metal and are substantially different from the flux invented by us in both composition and in the manner in which they are used. Our flux is characterized by the absence of any halides other than the chloride and by the presence of only a minor amount of alkali metal chlorides, proportioned so as to produce a composition having a melting point well below 500° C.

Another prior art flux is described in United States Patent 1,293,823 issued to George P. Luckey February 11, 1919. The specific flux therein described is formed by combining 65% of zinc chloride and 10% of ammonium chloride with 25% of a fused mixture of potassium chloride and sodium chloride in which the proportions of KCl:NaCl are those of their eutectic composition. The patentee also suggests that one or more of the chlorides of lithium, cadmium, copper, calcium, zinc, lead or ammonium may be combined with the eutectic mixture of KCl and NaCl. We have found that to obtain the optimum flowability, the composition should contain the chlorides of sodium and potassium and lithium proportioned within a specific relatively narrow range of proportions, and we have further found that to obtain the desired corrosion resistance and strength the relative proportion of zinc chloride to the total alkali metal chloride content should be between about 8.5:1 and 9.2:1 and preferably 9:1 by weight.

In brief, flux compositions comprehended within our invention are those containing (a) the three above noted alkali metal chlorides in the following stated relative proportions:

|  | Mol Percent | Corresponding Weight Percent |
|---|---|---|
| NaCl | between about 5 and 25 | 5 and 29. |
| KCl | between about 15 and 48 | 21 and 61. |
| LiCl | between about 40 and 75 | 29 and 66. | the total being 100 mol percent; and (b) between about 85 and 92% by weight of zinc chloride.

In a more preferred composition in accordance with our invention the alkali metal chloride portion of our composition comprises a mixture of the three alkali metal chlorides in the relative proportions embraced within an area on ternary diagram defined by the following points:

|  | Mol Percent | Corresponding Weight Percent |
|---|---|---|
| (1) | 75% LiCl, 10% NaCl, 15% KCl | 66% LiCl, 12% NaCl, 22% KCl. |
| (2) | 60% LiCl, 25% NaCl, 15% KCl | 50% LiCl, 29% NaCl, 21% KCl. |
| (3) | 40% LiCl, 25% NaCl, 35% KCl | 29% LiCl, 26% NaCl, 45% KCl. |
| (4) | 47% LiCl, 5% NaCl, 48% KCl | 34% LiCl, 5% NaCo, 61% KCl. |
| (5) | 75% LiCl, 5% NaCl, 20% KCl | 64% LiCl, 6% NaCl, 30% KCl. |

In the use of our fluxes we have found that the use of an additional solder material is entirely unnecessary and that not only may aluminum be joined to aluminum, copper or other metals or alloys, but that alloys of aluminum, even those including up to as much as 13% silicon, may be joined to such metals or alloys with the formation of joints which are resistant to mechanical failure or chemical attack (e. g. corrosion). The following examples will serve to further illustrate fluxes prepared in accordance with our invention.

Example I

A flux composition was prepared by melting together 54 parts by weight of lithium chloride with 36 parts by weight of potassium chloride and 10 parts by weight of sodium chloride. Such a mixture corresponds to molar proportions of 66:25:9. The melt was allowed to cool and was then pulverized. To the pulverized composition, which had a melting point of about 370° F., there was added zinc chloride in the proportion of 9 parts of zinc chloride by weight to each part of the alkali metal chloride mixture. The resulting mixture had a melting point of about 475° F. at which temperature the composition was permitted to cool and solidify, after which it was pulverized preparatory to joining various aluminum and aluminum alloy members. The composition was used to join pieces of aluminum alloy type 2S, 3S and 61S to one another by merely heating the members positioned with the flux composition laid down in powder form at the joint. A small amount of fuming took place as the assembly was heated to the reaction temperature, 725–750° F. Reaction and soldering were complete when the liquid flux separated, revealing molten metal, i. e., zinc or a zinc-aluminum alloy at the joint. A thin grayish film remained after the reaction and this was readily removed by rinsing the joint in warm water.

Example II

A flux composition was prepared by mixing 54 mol percent of lithium chloride, 36 mol percent of potassium chloride and 10 mol percent of sodium chloride and melting the dry mixture in a Pyrex glass vessel. Nine parts of zinc chloride were added to the melt for each part by weight of the melt and the mixture was allowed to cool after the zinc chloride had formed a homogeneous mixture with the melt. The resulting solid rod was wrapped in a thin resinous plastic sold commercially as Saran Wrap and stored for future use. It was found to produce a satisfactory joint comparable with that of Example I.

In order to evaluate the corrosion resistance of the joints made with the compositions of our invention, a test was designed in which butt joints of various combinations of metals were placed in a moisture chamber in which the atmosphere was saturated with water vapor and which was maintained at 45° C. with a 5-pound weight hung on each test specimen (0.250 x .020 inch on cross section at joint). Thus the test determined the life of the joint under a minimum stress of about 1000 pounds per square inch. The results were as follows:

| Joined | Hours before Failure |
|---|---|
| Al to Cu | 300 |
| 2S Al Alloy to Cu | 861 |
| 2S Al Alloy+2S Al Alloy | 288 |

Joints prepared with the same metals and alloys but with other fluxes lasted only a fraction of the time, generally considerably less than 60 hours before failure.

Another method of evaluating the joints was to immerse them in boiling tap water and to observe the number of hours elapsed before the joint lost its strength and fell apart. Results were as follows for joints of 2S aluminum alloy to 2S aluminum alloy:

| | Hrs. |
|---|---|
| Alcoa flux; Alcoa 803 solder | <22 |
| Kester cored solder | <15 |
| Example I flux, no solder | 360 |

One of the significant advantages of our flux is the absence therefrom of halides other than chlorides. We have found that the incorporation of small amounts of fluorides in reaction type fluxes, such as those described, produces an undesirable increase in the melting point of the composition and also in many instances results in the evolution of noxious fluorine-containing gaseous products as a result of the joining operation. Fluxes containing either bromides or iodides have been experimented with and found to be, in general, much less acceptable than those described by us. Furthermore, the inclusion of fluorides, bromides or iodides adds appreciably to the cost of the final product and since it tends to produce disadvantages not compensated for by any noticeable advantage, the additional expense renders the substitution of such compounds undesirable as well as unnecessary.

The fluxes developed by us have been found to be affected by moisture in the atmosphere, and it is, therefore, recommended that they be stored in sealed containers of preferably glass, or of a plastic resistant to attack by the flux material. However, a stable paste may be made from the prepared powder by addition of a controlled amount of water.

For purposes of illustration we have described the use of our flux in the form of a prefused mixture of the ingredients. It should be noted, however, that the same results may be obtained by the use of compositions in which the ingredients have not been previously fused. Thus mixtures of two or more of the four components may be prepared by simply blending the ingredients in the form of dry powders in suitable proportions and stored as a mixture. The unfused premixed materials are used in the same manner as the prefused material. Alternatively some of the components may be prefused and the product combined with unfused powders of the remaining constituents. Finally, our invention may be practiced with mixtures formed from the individual ingredients at the time the joining is being effected.

We claim:

1. A solder flux composition consisting essentially of between about 82% and 95% by weight of zinc chloride and between about 5% and 18% by weight of a mixture of alkali metal chlorides having a melting point below 500° C. and consisting of a mixture of lithium chloride, sodium chloride, and potassium chloride, in which the lithium chloride comprises between about 29% and 66% by weight, the sodium chloride comprises between about 5% and 29% by weight and the potassium chloride comprises between about 21% and 61% by weight.

2. A solder flux composition consisting essentially of between about 82% and 95% by weight of zinc chloride and between about 5% and 18% by weight of a mixture of alkali metal chlorides having a melting point below 500° C. and consisting of a previously fused mixture of lithium chloride, sodium chloride, and potassium chloride, in which the amount of lithium chloride is between 29% and 66% by weight, the amount of sodium chloride is between 6% and 29% by weight and the amount of potassium chloride is between 21% and 43% by weight.

3. A composition adapted to join aluminum and aluminum alloy members consisting essentially of about 9 parts by weight of zinc chloride and about 1 part by weight of a mixture of alkali metal chlorides proportioned so as to fall within the following points on a ternary composition diagram:

75% LiCl, 10% NaCl, 15% KCl
60% LiCl, 25% NaCl, 15% KCl
40% LiCl, 25% NaCl, 35% KCl
47% LiCl, 5% NaCl, 48% KCl
75% LiCl, 5% NaCl, 20% KCl all said points being based on molar percentages of the alkali metal chlorides.

4. A method of joining members of aluminum and its alloys to other members of aluminum, copper, and their alloys, which comprises: assembling the members with the joint in a substantially horizontal plane and applying to said assembled members, a composition consisting essentially of about 9 parts by weight of zinc chloride and about 1 part by weight of alkali metal chlorides in the following relative proportions: between about 5% and 29% by weight NaCl, between about 21% and 61% by weight KCl and between about 29% and 66% LiCl; heating the assembly and joining and fluxing composition to melt the composition; further heating the assembly and composition to about 720° F. to permit the zinc chloride to react with the metals being joined; permitting the joint to cool after a clear melt has formed and removing any adherent salt by rinsing the cool assembly with water.

No references cited.